UNITED STATES PATENT OFFICE.

EBENEZER W. STRAIN, OF PHILADELPHIA, PENNSYLVANIA.

RUBBER COMPOUND AND MATERIAL FOR USE IN MAKING SAME.

No. 875,298.　　　Specification of Letters Patent.　　　Patented Dec. 31, 1907.

Application filed October 30, 1905. Serial No. 285,040.

*To all whom it may concern:*

Be it known that I, EBENEZER W. STRAIN, a citizen of the United States, residing at Philadelphia, in the county of Philadelphia and State of Pennsylvania, have invented new and useful Improvements in Rubber Compound and Material for Use in Making Same, of which the following is a specification.

The object of this invention is to provide a rubber compound which shall possess all of the properties of rubber and which, in addition, will not be deleteriously affected by the contact therewith of oils, thereby presenting a compound particularly serviceable for use in bearings, and for similar applications, where lubricants are employed.

It is well known to the rubber industry that petroleum and its products are solvents of rubber and very destructive to manufactured goods, but I have discovered that certain products of asphaltic petroleums, when prepared as hereinafter described, are non-solvent of rubber unless high temperatures are applied. These products, however, of themselves not only have no affinity for rubber, but when combined with it destroy, to a great extent, the elastic properties thereof and render it undesirable for use except for filling.

In proceeding according to my invention I first take a crude asphaltic petroleum and eliminate the volatile constituents thereof by distillation, after which the remaining heavy products are also distilled and refined by the ordinary methods known to the trade, leaving in the still a bitumen in some respects resembling black wax, and which, when blown in the still by the usual method employed by oil refiners, produces an elastic bitumen that is pliable at low temperatures. This bitumen will combine with rubber at high temperatures, varying from 250° F. to 350° F., but, as stated above, is deleterious in its effect when used in a raw state. To make this product valuable for use with rubber, I combine with the bitumen a product of the sap of pine or resinous trees, known to the trade as virgin dip or gum thus; or I may employ, in lieu of either of the latter, the resinous matter left at the still after the spirits of turpentine have been eliminated, which is known to the trade as rosin pitch. All of these last-mentioned substances contain acids having an affinity for rubber, and when combined with the before-mentioned bitumen produce a compound which may be readily combined with rubber, resulting in the production of a rubber compound possessing the properties above noted.

Instead of using the bitumen and virgin dip, or gum thus as first compounded, I may use the distilled product resulting from this compound, as hereinafter described. The asphaltic bitumen is a solid, gummy, waxy substance, while the distillate therefrom is a soft semi-fluid gummy substance, substantially the same as the bitumen, except that the distilling removes a portion of the carbon, no paraffin crystals being formed by the distillation. The bitumen, and the distillate therefrom, are substantially the same in the principal chemical constituents.

In practice I take eighty to ninety per cent. asphaltic base bitumen and ten to twenty per cent. of oxidized hydro-carbon of the terpene series, such as virgin dip or gum thus, and place these two substances in a kettle and subject them to a temperature of about 325° F. After the ingredients are thoroughly combined the product is then ready for use to combine with rubber. If preferred, however, I may place the bitumen and virgin dip, or gum thus, in a still, instead of in a kettle, and, after a temperature of 325° has been reached, continue the operation at a still higher temperature sufficient to distil the whole product together, and the resulting distillate can then be combined with rubber, with the exception of the product first coming over, which is a volatile solvent of rubber.

As stated above, I may use rosin in place of the virgin dip or gum thus, but either of the latter is preferred.

It may be explained that virgin dip is the first run of sap from a tree, while gum thus is the sap from the tree in the later years of its life. The addition of the virgin dip or gum thus, or rosin produced from the same, imparts to the petroleum an affinity for rubber, and prevents the shortening of the elastic properties natural in rubber when petroleum products are combined therewith.

So far as I am aware, the residue from asphaltic base petroleum, as made within the past two years, is unlike any made in previous years, owing to the different character of the crude petroleum and a process results in the production of a bitumen of a rubber-like, gummy and waxy character, one which is pliable at very low temperatures and which does not fly into fragments under a blow, as does ordinary paraffin base bitumen. The process referred to results in partially oxidizing the bitumen, while it is in the still, at a high temperature, thereby rendering it proof against oxidation at ordinary temperatures. The distillate from this product is readily oxidized and vulcanized, especially when in combination with resinous matters for which it has an affinity. I therefore wish particularly to emphasize the fact that the use of an asphaltic bitumen oxidized at a high temperature constitutes one of the leading features of the invention.

It will be understood that broadly my compound includes as its chief ingredient the bitumen from asphaltic petroleum. I do not limit myself to the use of petroleum from any particular locality, except so far that it is essential that in the use of such a substance I obtain therefrom a bitumen. As an illustration I might mention that the asphaltic petroleum obtained from the State of Texas yields a bitumen satisfactory for my purpose.

Having thus fully described my invention, what I claim as new and desire to secure by Letters Patent, is:

1. A composition of matter comprising the bitumen from asphaltic petroleum and rubber.

2. A composition of matter comprising oxidized bitumen from asphaltic petroleum and rubber.

3. A composition of matter comprising the bitumen from asphaltic petroleum and a resinous sap.

4. A composition of matter comprising the bitumen from asphaltic petroleum and virgin dip or gum thus.

In testimony whereof I have hereunto set my hand in presence of two subscribing witnesses.

EBENEZER W. STRAIN.

Witnesses:
MARGARETHA VOGT,
FRANK R. STRAIN.